(12) United States Patent
Mizoguchi et al.

(10) Patent No.: US 10,289,153 B2
(45) Date of Patent: May 14, 2019

(54) MEMBER FOR ELECTRONIC DEVICE CHASSIS

(71) Applicant: LENOVO (SINGAPORE) PTE. LTD., Singapore (SG)

(72) Inventors: Fumitake Mizoguchi, Kanagawa-ken (JP); Takehito Yamauchi, Kanagawa-ken (JP); Yoshiyuki Shibayama, Gunma-ken (JP); Yuta Tsuganezawa, Kanagawa-ken (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 4 days.

(21) Appl. No.: 15/498,110

(22) Filed: Apr. 26, 2017

(65) Prior Publication Data

US 2017/0308119 A1    Oct. 26, 2017

(30) Foreign Application Priority Data

Apr. 26, 2016  (JP) .................................. 2016-87761

(51) Int. Cl.
| | |
|---|---|
| G06F 1/16 | (2006.01) |
| B32B 3/26 | (2006.01) |
| B32B 27/00 | (2006.01) |
| B29C 70/04 | (2006.01) |

(52) U.S. Cl.
CPC ............ *G06F 1/1616* (2013.01); *B29C 70/04* (2013.01); *B32B 3/266* (2013.01); *B32B 27/00* (2013.01); *G06F 1/1637* (2013.01); *G06F 1/1667* (2013.01); *G06F 1/1681* (2013.01); *B32B 2305/08* (2013.01); *B32B 2457/00* (2013.01)

(58) Field of Classification Search
None
See application file for complete search history.

(56) References Cited

U.S. PATENT DOCUMENTS

| | | | | |
|---|---|---|---|---|
| 8,659,720 | B2 * | 2/2014 | Sasaki ............... | G02F 1/133608 |
| | | | | 349/64 |
| 9,069,523 | B2 * | 6/2015 | Hayashida ............ | G06F 1/1601 |
| 2003/0197111 | A1 * | 10/2003 | Morimoto ............. | G06F 1/1616 |
| | | | | 248/694 |
| 2004/0227870 | A1 * | 11/2004 | Jang .................. | G02F 1/133604 |
| | | | | 349/64 |

(Continued)

FOREIGN PATENT DOCUMENTS

| | | |
|---|---|---|
| JP | 2000-286565 A | 10/2000 |
| JP | 2013232052 A | 11/2013 |

(Continued)

*Primary Examiner* — Courtney L Smith
*Assistant Examiner* — Rashen E Morrison
(74) *Attorney, Agent, or Firm* — Russell Ng PLLC; Antony P. Ng

(57) ABSTRACT

A member for chassis is provided. The member for chassis includes a frame part that is made of a thermoplastic resin bonded to at least a part of an external-form end face of a laminated sheet with an intermediate layer arranged between a pair of fiber reinforced resin sheets. The thermoplastic resin that configures the frame part is extended to a surface of the laminated sheet. An opening is provided on the surface of the laminated sheet that has been covered with the extended thermoplastic resin, and the member for chassis includes an anchor part formed by putting the thermoplastic resin into the opening.

17 Claims, 6 Drawing Sheets

(56) References Cited

U.S. PATENT DOCUMENTS

| | | | |
|---|---|---|---|
| 2009/0179806 A1* | 7/2009 | Ji | G06F 1/1616 343/702 |
| 2009/0185340 A1* | 7/2009 | Ji et al. | B29C 45/14786 361/679.21 |
| 2010/0165466 A1* | 7/2010 | Endo | B32B 7/14 359/599 |
| 2013/0285516 A1 | 10/2013 | Mizoguchi et al. | |
| 2015/0061479 A1 | 3/2015 | Yamamoto et al. | |
| 2015/0062808 A1 | 3/2015 | Abe et al. | |
| 2015/0092334 A1* | 4/2015 | Hayashida | G06F 1/1601 29/428 |
| 2016/0259366 A1* | 9/2016 | Kenney | G06F 1/1601 349/64 |
| 2017/0068271 A1 | 3/2017 | Mizoguchi et al. | |

FOREIGN PATENT DOCUMENTS

| | | |
|---|---|---|
| JP | 2015-46115 A | 3/2015 |
| JP | 2015-46471 A | 3/2015 |
| TW | 376185 B1 | 11/2012 |

\* cited by examiner

MEMBER FOR ELECTRONIC DEVICE CHASSIS

PRIORITY CLAIM

The present application claims benefit of priority under 35 U.S.C. §§ 120, 365 to the previously filed Japanese Patent Application No. JP2016-087761 with a priority date of Apr. 26, 2016, which is incorporated by reference herein.

TECHNICAL FIELD

The present invention relates to chassis in general, and in particular to a member for chassis for electronic devices such as laptop computers, tablet computers, etc.

BACKGROUND

The chassis of electronic devices, such as notebook personal computers (laptop PCs), tablet personal computers (tablet PCs), smartphones, etc., should be light in weight, small in thickness and high in strength. Accordingly, the popular choice of material for chassis of electronic devices is a laminated sheet having an intermediate layer made of a foamed material sandwiched between prepreg sheets (fiber reinforced resin sheets) prepared by impregnating reinforced fibers such as carbon fibers with a thermosetting resin such as an epoxy resin.

When such a laminated sheet is to be used in the chassis of laptop PCs, it is requested to perform machining of a desirable shape such as a wall part at least on a peripheral edge part of the laminated sheet. However, since the laminated sheet is configured by using a hard fiber reinforced resin sheet, the laminated sheet is low in degree of freedom of shape machining such as bending.

When configuring the chassis by coupling and fixing the member for chassis to the other member for chassis, it is necessary to form a nut that configures a female screw by insert-molding in a thermoplastic resin part that has been bonded to the laminated sheet. However, with such a configuration, since the nut is arranged in the thermoplastic resin part that has been bonded to a part located outside of the external-form end face of the laminated sheet, when a shock and external force are applied to the chassis, the shock and external force are transmitted from a screw that clamps together the two members for chassis directly to the thermoplastic resin part via the nut. As a result, there is a tendency that the load on the thermoplastic resin part which is inferior in strength to a laminated sheet part having a high strength or a bonded interface between the thermoplastic resin part and the laminated sheet is increased. In particular, when the nut that is formed by such insert-molding has been utilized for fixing a hinge that couples together two chassis of a laptop PC, it is feared that when the laptop PC is dropped, most of the load of the laptop PC will be applied to the nut and causes the thermoplastic resin that holds the nut to be broken.

Consequently, it would be preferable to provide an improved chassis member with a higher strength.

SUMMARY

In accordance with an embodiment of the present disclosure, a laminated sheet having an intermediate layer located between a pair of fiber reinforced resin sheets, a member for chassis having a thermoplastic resin bonded to at least a part of an external-form end face of the laminated sheet, wherein the thermoplastic resin is extended to a surface of the laminated sheet, and an opening provided in the surface of the laminated sheet that has been covered with the extended thermoplastic resin, wherein the member for chassis includes an anchor part formed by inserting the thermoplastic resin into the opening.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
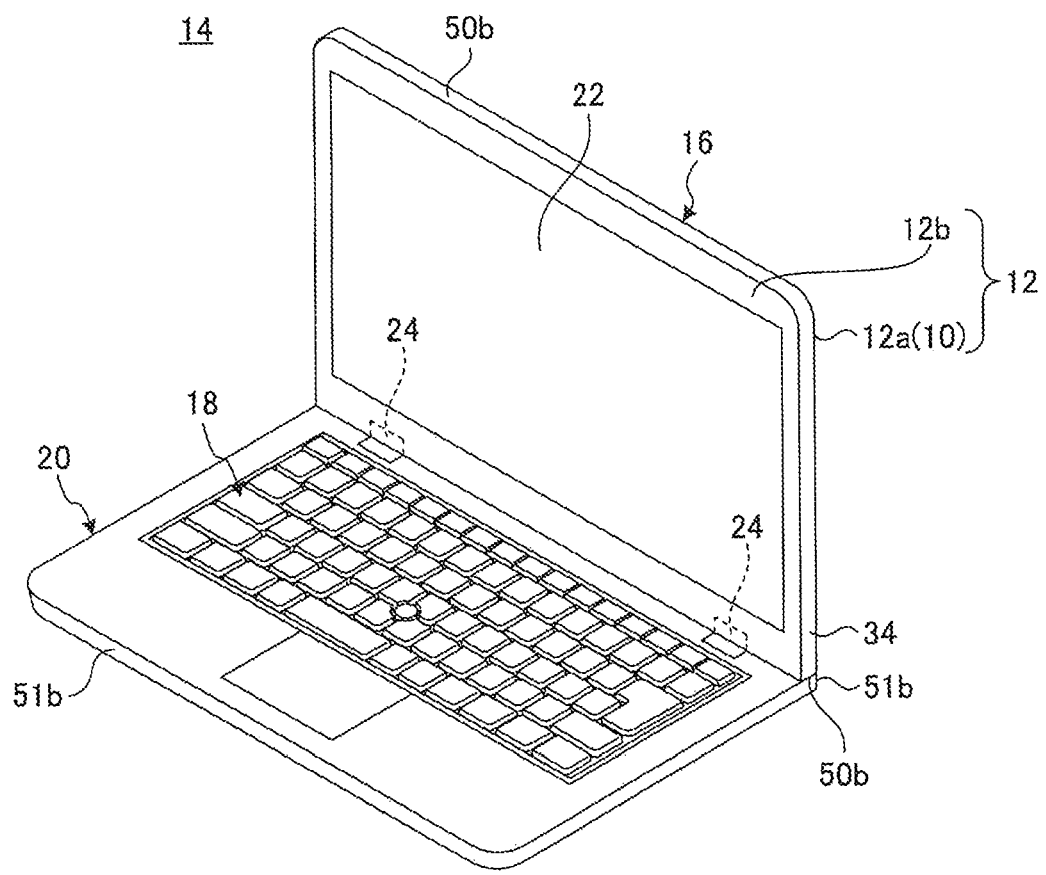
FIG. 1 is a perspective view of an electronic apparatus in which a preferred embodiment of the present invention can be incorporated.

FIG. 1 is a perspective view of an electronic apparatus 14 that includes a chassis 12 using a member for chassis 10 according to one embodiment of the present invention. As illustrated in FIG. 1, the electronic apparatus 14 includes an apparatus main body 20 having a keyboard device 18 and a rectangular sheet-shaped lid body 16 having a display device 22 configured by a liquid crystal display. The electronic apparatus 14 is a clamshell type apparatus that the lid body 16 has been coupled to the apparatus main body 20 to be openable and closable by left and right hinges 24.

The apparatus main body 20 is a flat box-shaped chassis and houses various electronic components such as a substrate, an arithmetic processing device, a hard disk device, a memory and so forth that are not illustrated in FIG. 1. The keyboard device 18 is arranged on an upper surface of the apparatus main body 20.

The lid body 16 includes the chassis 12 formed by superposing and coupling together a rear face cover 12a and a front face cover 12b and is electrically connected with the apparatus main body 20 by a not illustrated cable which has passed through the hinges 24. The rear face cover 12a is a cover member which covers side faces and a rear face of the lid body 16 and is configured by the member for chassis 10 according to the present embodiment. The lid body 16 is coupled with the apparatus main body 20 via the hinges 24 which have been screwed and fixed to the rear face cover 12a (also see FIG. 2). The front face cover 12b is a resinous cover member which covers the front face of the lid body 16 and a hole part through which the display device 22 which is configured by, for example, the liquid crystal display is exposed is formed in most part of the front face cover 12b.

Next, the configurations of the rear face cover 12a of the chassis 12 that is part of the lid body 16 and the member for chassis 10 that forms the rear face cover 12a will be specifically described.

Figure 2:
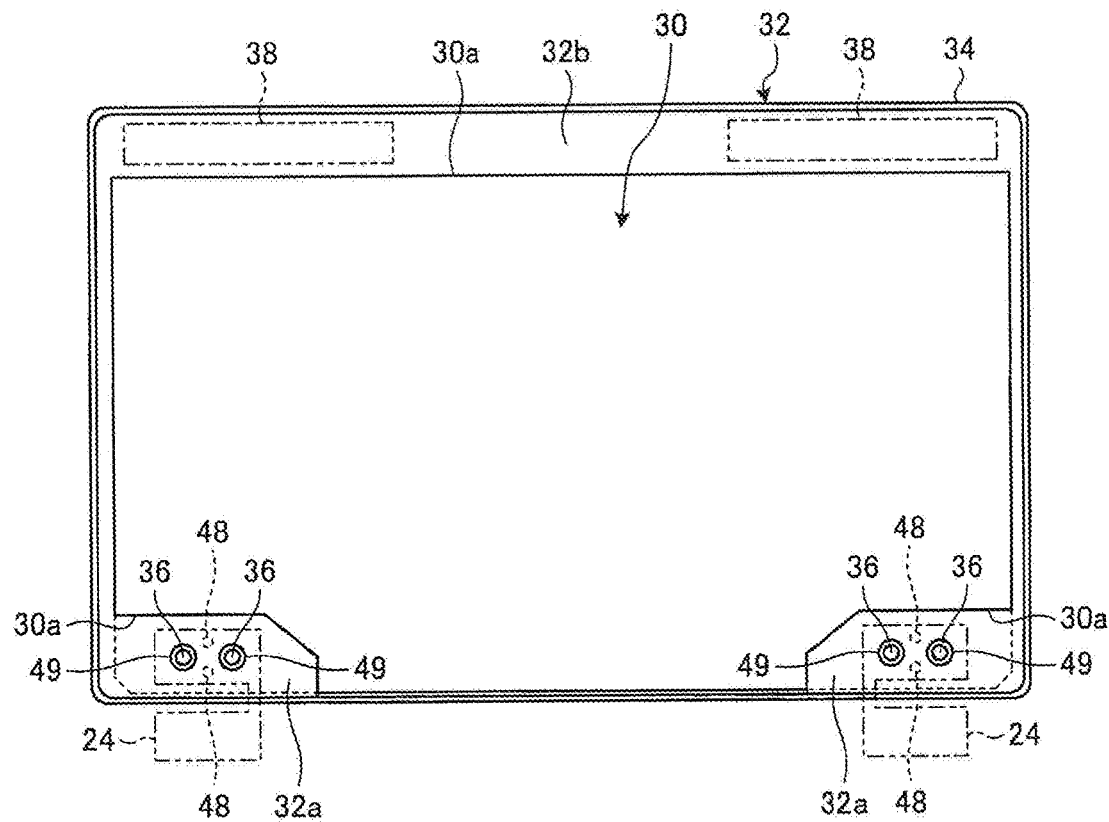
FIG. 2 is a plan view of a rear face cover of the chassis.
Figure 3:
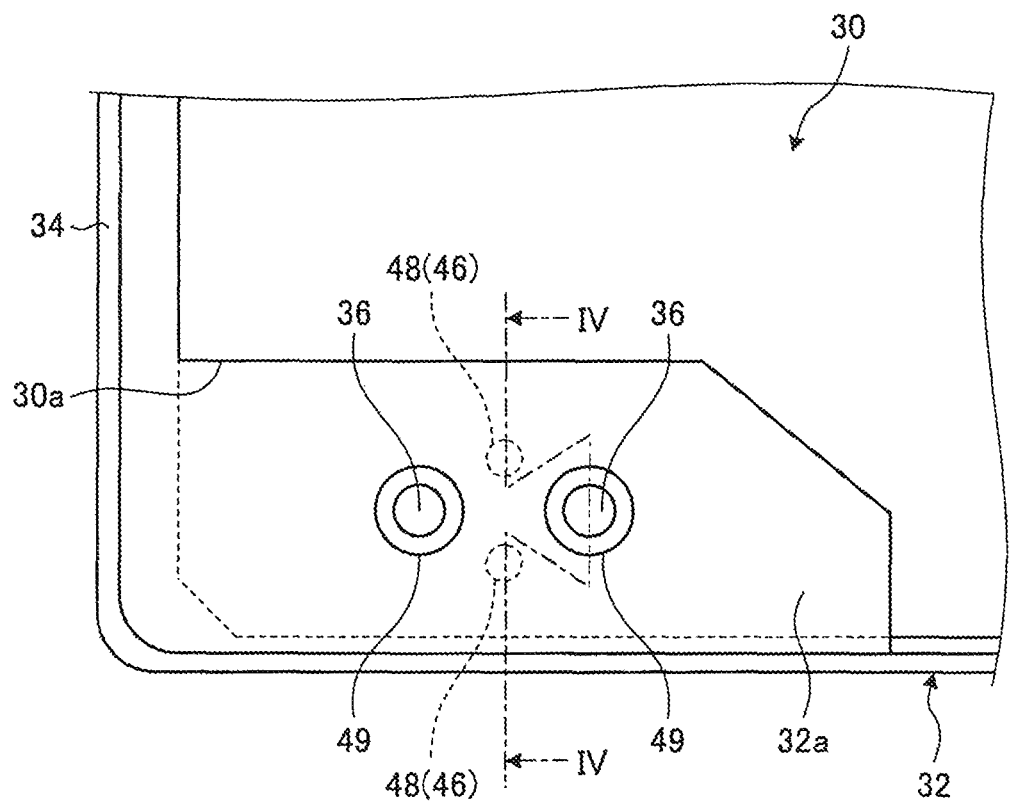
FIG. 3 is a plan view of a wide part and its vicinity of the rear face cover illustrated in FIG. 2.

FIG. 2 is a plan view of the rear face cover 12a of the chassis 12 and is the diagram that the rear face cover 12a that serves as the rear face of the lid body 16 has been viewed from the inner face side. FIG. 3 is a enlarged plan view of a wide part 32a and its vicinity of the rear face cover 12a illustrated in FIG. 2.

As described above, the rear face cover 12a is formed by the member for chassis 10. As illustrated in FIGS. 2-3, the member for chassis 10 includes a laminated sheet 30 that is formed to provide a three-layer structure so as to be light in weight and high in strength, and a frame part 32 that has been formed by bonding a thermoplastic resin to an external-form end face 30a of the laminated sheet 30. The rear face cover 12a includes a wall part 34 that is formed by using the frame part 32 of the member for chassis 10 so configured and serves as a peripheral edge part and four side faces of the rear face cover 12a and a sheet-shaped part which supports the rear face of the display device 22 is formed by using the laminated sheet 30.

On the chassis 12 (the lid body 16), the frame part 32 is provided with one pair of the left and right wide parts 32a on one edge side (a lower edge in FIG. 2) of the rear face cover 12a. The hinges 24 are fixed to the left and right wide parts 32a respectively by using a set (two screws in FIG. 2) of fixing screws 36. The frame part 32 is provided with a belt-shaped part 32b that extends in a left-to-right direction on the other edge side (an upper edge in FIG. 2) of the rear face cover 12a. Antennas 38 for radio communications are arranged in the belt-shaped part 32b.

Figure 4:
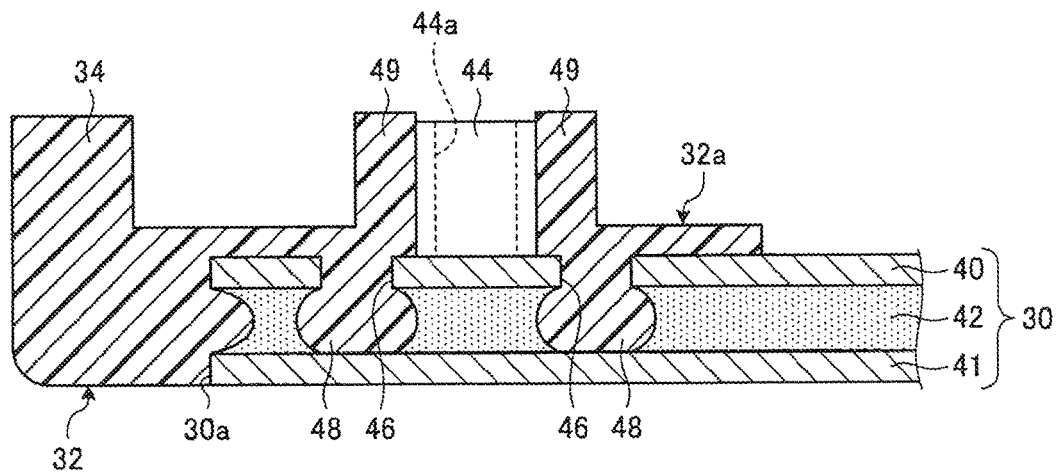
FIG. 4 is a sectional diagram of a sectional shape of the member for chassis along the IV-IV line in FIG. 3.
Figure 5:
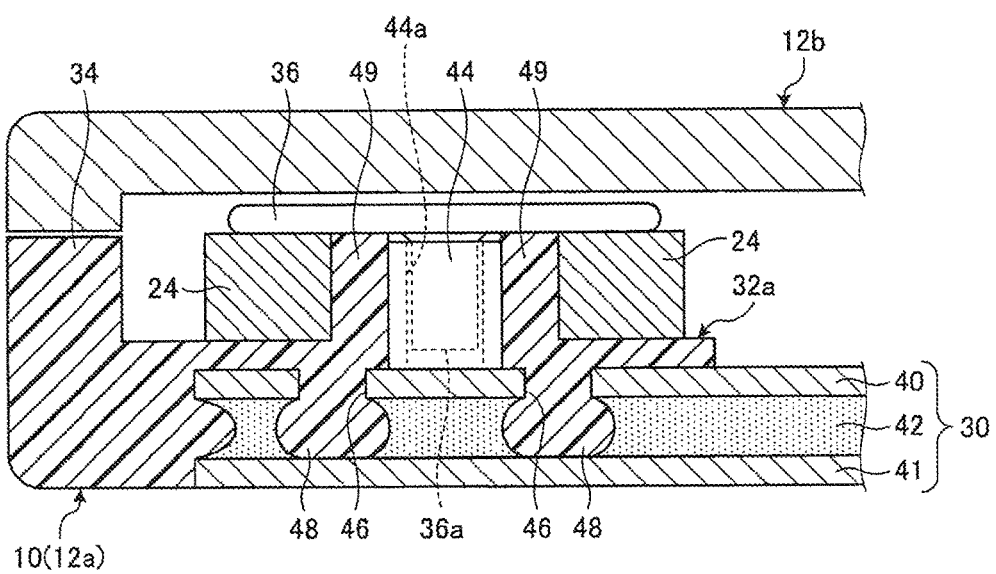
FIG. 5 is a sectional diagram of a state where a hinge has been fixed to the member for chassis illustrated in FIG. 4 by using a fixing screw.

Next, a specific configuration of the member for chassis 10 that configures the rear face cover 12a will be described. FIG. 4 is a sectional diagram schematically illustrating one example of a sectional shape along the IV-IV line in FIG. 3, that is, the sectional diagram in a thickness direction of a section which includes the laminated sheet 30 and the frame part 32 (the wide parts 32a) of the member for chassis 10. In addition, FIG. 5 is a sectional diagram illustrating one example of a state where the hinge 24 has been fixed to the member for chassis 10 illustrated in FIG. 4 by using the fixing screw 36.

As illustrated in FIG. 4, the member for chassis 10 includes the laminated sheet 30 that an intermediate layer 42 has been arranged between one pair of upper and lower fiber reinforced resin sheets 40 and 41 and the frame part 32 which has been bonded to the external-form end face 30a of the laminated sheet 30.

Each of the fiber reinforced resin sheets 40 and 41 is a prepreg prepared by impregnating reinforced fibers with a thermosetting resin such as an epoxy resin and so forth and has a sheet thickness of, for example, about 0.3 mm. In the present embodiment, a carbon fiber reinforced resin (CFRP) that carbon fibers have been used as the reinforced fibers is used. As the reinforced fibers, fibers other than the carbon fibers may be used and various materials such as metal fibers such as stainless fibers and so forth and inorganic fibers such as glass fibers and so forth may be used.

The intermediate layer 42 is arranged between one pair of the fiber reinforced resin sheets 40 and 41, serves as a soft spacer for isolating these hard fiber reinforced resin sheets 40 and 41 from each other and has a sheet thickness of, for example, about 0.6 mm. Owing to provision of the intermediate layer 42, a section modulus in a sheet thickness direction of the laminated sheet 30 is increased and the laminated sheet 30 has a light-weight and high-strength structure. The intermediate layer 42 is configured by, for example, a foamed layer which has been configured by a foamed sheet such as polypropylene and so forth, a fiber layer of the carbon fibers and so forth which have been assembled together with compressible gaps being contained therein and so forth.

The frame part 32 is bonded to the laminated sheet 30 by injection-molding the thermoplastic resin to the external-form end face 30a of the laminated sheet 30 so configured. As the thermoplastic resin which forms the frame part 32, for example, a polyethylene resin, a polypropylene resin and so forth may be used and also fiber reinforced resins (for example, GFRP) prepared by containing reinforced fibers such as glass fibers and so forth in these resins may be used. In the case of the present embodiment, the anchoring effect is caused to occur by conducting injection molding so as to put the thermoplastic resin which forms the frame part 32 into the intermediate layer 42 which has been sandwiched between the fiber reinforced resin sheets 40 and 41 and thereby the high bond strength is ensured.

It is possible to perform machining of a desirable shape such as the wall part 34 and so forth on the peripheral edge part of the laminated sheet 30 which is low in degree of freedom in machining such as bending, cutting and so forth by bonding the frame part 32 so formed to the laminated sheet 30. In addition, it is also possible to improve the degree of design freedom in installation of the antennas 38 in the frame part 32 which is made of a non-conductive material at positions distant from the fiber reinforced resin sheets 40 and 41 which are made of a conductive material and so forth (see FIG. 2). Although a configuration that the frame part 32 has been provided on the whole circumference of the external-form end face 30a of the laminated sheet 30 is illustrated in FIG. 2 by way of example, the frame part 32 may be also bonded to only a part of the external-form end face 30a.

As illustrated in FIGS. 3-5, each wide part 32a to which each hinge 24 has been screwed and fixed with the two fixing screws 36 is formed by extending the thermoplastic resin which has been bonded to the external-form end face 30a of the laminated sheet 30 to the surface (the surface of one fiber reinforced resin sheet 40) of the laminated sheet 30. That is, the wide part 32a is a part formed by providing the thermoplastic resin in the form of a thin sheet on the surface of the laminated sheet 30. Then, screwing and fixing of the hinge 24 is made possible by forming each nut 44 which serves as the female screw part into which the fixing screw 36 is to be screwed in the wide part 32a made of the thermoplastic resin which has been extended to the surface of the laminated sheet 30 by insert molding. That is, the nut 44 is arranged on the surface of the laminated sheet 30.

Every two hole parts 46 are formed in the surface of the laminated sheet 30 which has been covered with the wide part 32a made of the thermoplastic resin which has been extended to the surface of the laminated sheet 30 at positions corresponding to each wide part 32a (also see FIG. 2 and FIG. 3). Each hole part 46 is formed so as to have a depth dimension that it extends from one fiber reinforced resin sheet 40 which serves as the surface of the laminated sheet 30 and reaches the intermediate layer 42. The thermoplastic resin which configures the wide part 32a enters each hole part 46 and forms each anchor part 48 in each hole part 46.

The anchor part 48 makes the anchoring effect occur between the wide part 32*a* and the laminated sheet 30 in a direction (the in-plane direction) that the positions of both of the wide part 32*a* and the laminated sheet 30 deviate from each other in parallel thereby to make the high bond strength generate.

Moreover, in the present embodiment, the hole part 46 reaches the intermediate layer 42 and the injection molding is conduced such that the thermoplastic resin which forms the anchor part 48 enters the intermediate layer 42 which has been sandwiched between the fiber reinforced resin sheets 40 and 41. Thereby, the anchor part 48 makes the anchoring effect occur between the wide part 32*a* and the laminated sheet 30 also in a direction that the wide part 32*a* and the laminated sheet 30 mutually superpose (the out-of-plane direction which is orthogonal to the in-plane direction) thereby to make the high bond strength generate.

Incidentally, in the present embodiment, the hole part 46 is configured so as to have the depth dimension that the hole part 46 extends from one fiber reinforced resin sheet 40 and reaches the intermediate layer 42. However, the hole part 46 may have a depth dimension that the hole part 46 is formed in one fiber reinforced resin sheet 40 and does not reach the intermediate layer 42 or may have a depth dimension that the hole part 46 extends through the intermediate layer 42 down to the middle of the other fiber reinforced resin sheet 41 or further extends through the other fiber reinforced resin sheet 41.

The nut 44 is insert-molded with the thermoplastic resin in a state of being arranged in abutment on the surface of the laminated sheet 30 whose one end face is covered with the wide part 32*a*. That is, the surrounding part other than the surface of the laminated sheet 30 and the other end face on the opening part side of the nut 44 is covered with the thermoplastic resin which has formed the wide part 32*a*. Thereby, the nut 44 is brought into a state where an outer circumferential surface thereof is surrounded by a cylindrical boss part 49 which stands upright from the surface of the laminated sheet 30 and is rigidly positioned and fixed with the thermoplastic resin which has formed the wide part 32*a*.

As illustrated in FIGS. 2-3, the two anchor part 48 are provided at positions between the two mutually adjacent nuts 44, 44 adapted to fix one hinge 24 with the two fixing screws 36. Further, the two anchor parts 48 are provided so as to be arranged side by side in a direction (in a top-to-down direction in FIGS. 2-3) which is orthogonal to a direction (in a left-to-right direction in FIGS. 2-3) that the two mutually adjacent nuts 44, 44 are arranged side by side.

As one procedure of a manufacturing method for the member for chassis 10 configured in this way, first, one pair of the planar-shape fiber reinforced resin sheets 40 and 41 is prepared, the planar-shape intermediate layer 42 is sandwiched between the one pair of the fiber reinforced resin sheets 40 and 41, the whole is pressed in a lamination direction and thereby the laminated sheet 30 is formed. Then, the laminated sheet 30 is set in a mold, the molten thermoplastic resin is charged into a cavity of the mold to injection-mold the thermoplastic resin so as to come into contact with the external-form end face 30*a* of the laminated sheet 30 and thereby the frame part 32 is formed.

Next, the hole part 46 used for provision of the anchor part 48 is formed in a predetermined place of the laminated sheet 30 that the frame part 32 has been bonded to the external-form end face 30*a* by machining, laser beam machining and so forth, the nut 44 is arranged on the surface of the laminated sheet 30 and is set in another mold. Then, the molten thermoplastic resin is charged into the cavity of the mold to injection-mold the thermoplastic resin so as to come into contact with the surface of the laminated sheet 30 (the fiber reinforced resin sheet 40) and thereby the wide part 32*a* in which the nut 44 is insert-molded and from which the boss part 49 has projected is formed.

Consequently, as illustrated in FIG. 4, the member for chassis 10 which includes the frame part 32 formed by bonding the thermoplastic resin to the external-form end face 30*a* of the laminated sheet 30, the wide part 32*a* which has been formed by bonding the thermoplastic resin to the surface of the laminated sheet 30 and in which the nut 44 has been insert-molded, and the anchor part 48 formed by implanting the thermoplastic resin from the wide part 32*a* into the laminated sheet 30 is formed. Incidentally, the thermoplastic resin which forms the frame part 32 and the thermoplastic resin which forms the wide part 32*a* which holds the nut 44 and is provided with the anchor part 48 may be molded together in one mold.

Incidentally, when the hinge 24 is to be screwed to the member for chassis 10 configured in this way, as illustrated in FIG. 5, the hinge 24 is placed on the wide part 32*a* and a screw part 36*a* of the fixing screw 36 is screwed into a screw part 44*a* of the nut 44. Thereby, since the rear face cover 12*a* that the hinges 24 have been screwed and fixed to the member for chassis 10 is formed, it is possible to construct the chassis 12 by superposing the front face cover 12*b* on the rear face cover 12*a* and coupling the covers 12*a* and 12*b* together.

As described above, in the member for chassis 10 according to the present embodiment, in the configuration that the frame part 32 which is made of the thermoplastic resin has been bonded to at least a part of the external-form end face 30*a* of the laminated sheet 30 that the intermediate layer 42 has been arranged between the one pair of fiber reinforced resin sheets 40 and 41, the thermoplastic resin is extended to the surface of the laminated sheet 30, the hole part 46 is formed in the surface of the laminated sheet 30 which has been covered with the extended thermoplastic resin and the member for chassis 10 includes the anchor part 48 formed by putting the thermoplastic resin into the hole part 46.

As described above, the member for chassis 10 includes the anchor parts 48 formed by putting the thermoplastic resin which has been extended from the external-form end face 30*a* of the laminated sheet 30 to the surface thereof into the hole part 46 in the laminated sheet 30. Thereby, it is possible to configure the thermoplastic resin which has been extended to the surface of the laminated sheet 30 integrally with the high-strength laminated sheet 30 with the high bond strength. Therefore, for example, it is possible to stably clamp and fix the other member to the member for chassis 10 by providing the female screw part and the nut 44 in the part of the thermoplastic resin which has been extended to the surface of the laminated sheet 30 or to stably adhere and fix the other member to the member for chassis 10 with an adhesive and so forth. Accordingly, even when the external force and the shock have been applied to the other member which has been fixed to the part of the thermoplastic resin and the member for chassis 10, it is possible to accept the external force and the shock by the high-strength laminated sheet 30 via the anchor part 48. Consequently, breakage of the thermoplastic resin which has been extended to the surface of the laminated sheet 30 and/or delamination of the thermoplastic resin from the surface of the laminated sheet 30 are/is suppressed and it is possible to obtain the chassis 12 which is high in strength and high in anti-shock property. In particular, in the member for chassis 10, owing to provision of the anchor part 48 in the vicinity of the nut 44 used for clamping and fixing the hinge 24, it is possible to secure the strength of the member for chassis 10 while avoiding an increase in thickness of the chassis on each part where the hinge 24 is formed.

In addition, in the member for chassis 10, the nut 44 is superposed and arranged on the laminated sheet 30 which is higher in strength than the frame part 32 which has been formed using the thermoplastic resin. Thereby, for example, in a configuration that the hinge 24 has been clamped and fixed to the member for chassis 10 by screwing the fixing screw 36 into the nut 44, even when the external force which works in a bending direction has been added to the rear face cover 12a which configures the chassis 12, the nut 44 and the boss part 49 which holds the nut 44 are arranged on the laminated sheet 30 and therefore it is possible to accept this external force by the laminated sheet 30. In addition, the laminated sheet 30 and the thermoplastic resin which forms the boss part 49 are bonded together via the anchor part 48. Consequently, it is possible to avoid application of heavy loads onto the frame part 32 which has been formed using the thermoplastic resin which is inferior to the laminated sheet 30 in strength and onto a bonded interface between the frame part 32 and the external-form end face 30a of the laminated sheet 30.

In the member for chassis 10, the nut 44 that has been insert-molded in and positioned and fixed to the boss part 49 which has been formed using the thermoplastic resin is provided as the female screw part in the part of the thermoplastic resin which has been extended to the surface of the laminated sheet 30. Accordingly, for example, in a case where the electronic apparatus 14 which is in a state where the lid body 16 has been closed and superposed on the apparatus main body 20 has been fallen to the ground and the floor surface, it is feared that the stress may be concentrated on the root of the boss part 49 and the boss part 49 may be broken under the influence of the shock concentrated on the hinge 24 and the boss part 49 and the nut 44 may fall off. In this point, since in the member for chassis 10, the thermoplastic resin which forms the boss part 49 is rigidly bonded to the laminated sheet 30 via the anchor part 48, it is possible to effectively prevent the boss part 49 and the nut 44 from falling off.

Figure 6:
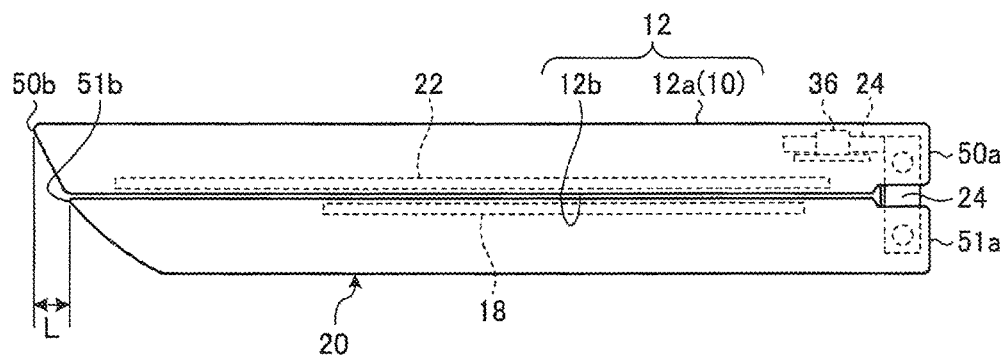
FIG. 6 is a side view of a structure of the electronic apparatus illustrated in FIG. 1, in a state where a lid body thereof has been closed.

In particular, the electronic apparatus 14 has a configuration that as illustrated in FIG. 6, the other end part (an open end part 50b) on the opposite side of one end part (a coupling end part 50a) of the chassis 12 which has been coupled with the apparatus main body 20 via the hinge 24 projects in a state where the position thereof deviates from the position of the other end part (an open end part 51b) on the opposite side of one end part (a coupling end 51a) on the hinge 24 side of the apparatus main body 20 by a distance L in a direction directing from one end parts toward the other end parts. Accordingly, as illustrated in FIG. 6, in a case where the electronic apparatus 14 which is in the state where the lid body 16 has been closed and superposed on the apparatus main body 20 has been fallen to the ground and the floor surface in a state of directing the open end parts 50b and 51b downward as lower ends, first, the most projected open end part 50b of the lid body 16 comes into abutment on the ground and so forth under the influence of the shock. Then, the load of the apparatus main body 20 which has been coupled with the lid body 16 via the hinge 24 is fully applied to the hinge 24 and the load acts on the nut 44 and the boss part 49. However, in the electronic apparatus 14, the thermoplastic resin which forms the boss parts 49 is implanted into the laminated sheet 30 as the anchor part 48. Therefore, it is possible to accept the load that has been applied from the apparatus main body 20 and has acted on the nut 44 and the boss part 49 via the hinge 24 by the high-strength laminated sheet 30 via the anchor part 48 and the boss part 49 and the nut 44 are effectively prevented from being broken and falling off. In particular, in the general Laptop PC, since there are many cases where the apparatus main body 20 is configured by an article which is heavier than the lid body 16, the anchoring effect by the anchor parts 48 becomes highly effective.

In the electronic apparatus 14, the set of nuts 44 which are the female screw parts is arranged side by side in a direction (in the left-to-right direction in FIG. 2 and FIG. 3) along the coupling end parts 50a and 51a of the chassis 12 and the apparatus main body 20 which acts as the other chassis. Then, the anchor part 48 is arranged at the position between the two mutually adjacent nuts 44 and 44 so as to fix one hinge 24 (see FIG. 2 and FIG. 3). Thereby, for example, when the electronic apparatus 14 has been fallen in the state of directing the open end parts 50b and 51b downward as the lower ends as described above, it is possible to accept the loads generated on the two nuts 44 and 44 which have fixed one hinge 24 by the anchor part 48 which is arranged between the two nuts in a well-balanced state. Accordingly, the anti-shock property brought about by the anchor part 48 is more improved. For example, in a case where the three nuts 44 have been arranged adjacently to one another in the left-to-right direction, it is preferable to arrange the anchor parts 48 between the central nut 44 and the left end nut 44 and between the central nut 44 and the right end nut 44.

In the electronic apparatus 14, one pair of the anchor parts 48 is arranged side by side in the direction (in the top-to-bottom direction in FIG. 2 and FIG. 3) directing from the coupling end parts 50a and 51a of the chassis 12 (the lid body 16) and the apparatus main body 20 toward the open end parts 50b and 51 b on the opposite side. Thereby, for example, when the electronic apparatus 14 has been fallen to the ground and so forth in the state of directing the open end parts 50b and 51b downward as the lower ends, it is possible to accept the loads generated on the two nuts 44 and 44 which have fixed one hinge 24 by the anchor parts 48 which have been arranged side by side in the orthogonal direction between the two nuts 44 and 44 in the more well-balanced state. Accordingly, the anti-shock property brought about by the anchor part 48 is more improved.

In the electronic apparatus 14, the anchor part 48 is arranged in the state where the position thereof deviates from the position of the nut 44 which is the female screw part in the direction directing from the coupling end parts 50a and 51a toward the open end parts 50b and 51b on the opposite side of the chassis 12 and the apparatus main body 20 (see FIG. 3). Thereby, for example, when the electronic apparatus 14 has been fallen in the state of directing the open end parts 50b and 51b downward as the lower ends, it is possible to accept the loads generated on the nuts 44 and 44 which have fixed the hinge 24 by the anchor part 48 the position of which deviates from the position of each nut 44 in the falling direction of the electronic apparatus 14 in the well-balanced state. Accordingly, the anti-shock property by the anchor part 48 is more improved.

Figure 7:
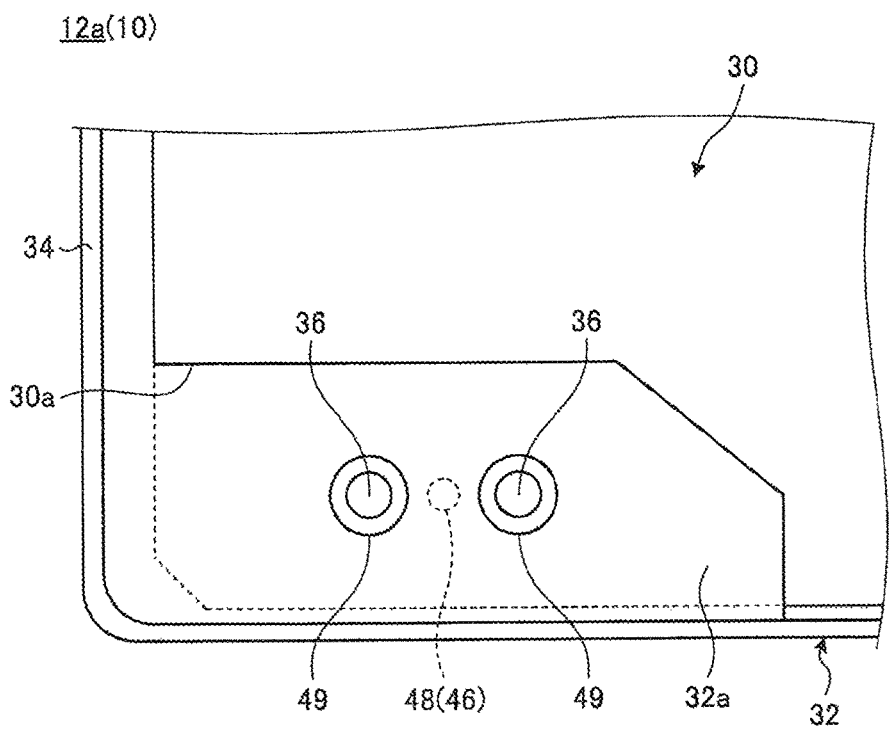
FIG. 7 is a plan view of the wide part and its vicinity of the rear face cover in a first altered example that the arrangement of the anchor part has been changed.

As a matter of course, it is possible to appropriately change the number of the nuts 44 to be installed as the female screw parts and the arrangement of the anchor parts 48. For example, FIG. 7 is a plan view enlargedly illustrating the wide part 32a and its vicinity of the rear face cover 12a in a first altered example that the arrangement of the anchor parts 48 has been changed. Although, in the above-mentioned embodiment, the configuration that the two anchor parts 48 have been arranged side by side in the direction which is orthogonal to the direction that the nuts 44 and 44 have been arranged side by side at the positions between the adjacent nuts 44 and 44 has been exemplified, one anchor part 48 may be provided for the adjacent nuts 44 and 44 as illustrated in FIG. 7. In a case where only one anchor part 48 is to be provided for the two nuts 44 and 44, the anchor part 48 may be arranged at a position located at the center between the two nuts 44 and 44.

Figure 8:
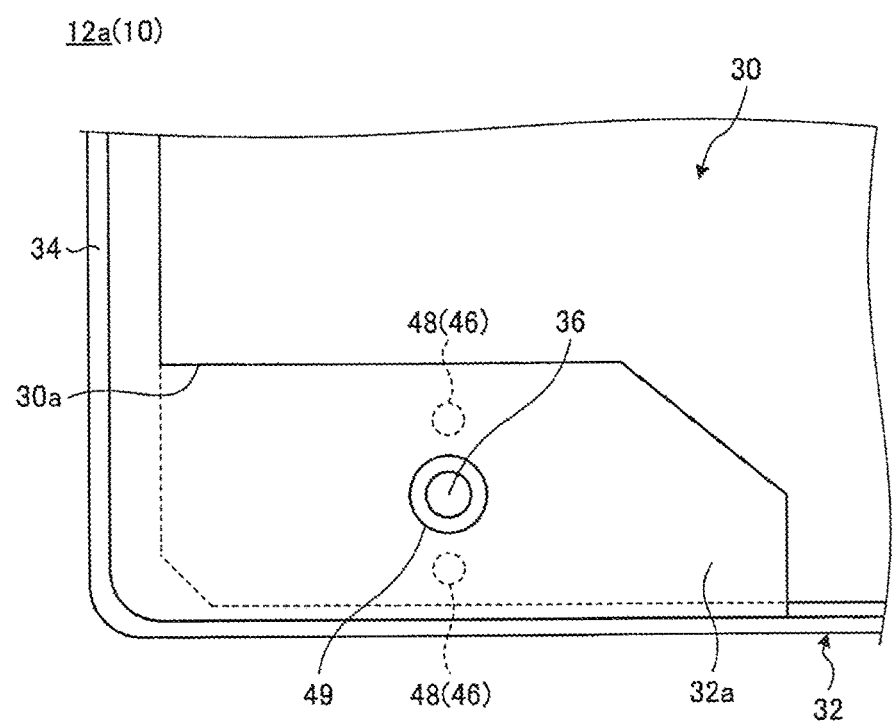
FIG. 8 is a plan view of the wide part and its vicinity of the rear face cover in a second altered example that the installation number of nuts has been changed.

In addition, for example, FIG. 8 is a plan view enlargedly illustrating the wide part 32a and its vicinity of the rear face cover 12a in a second altered example that the installation number of the nuts 44 has been changed. In the above-mentioned example, the configuration that the two nuts 44 are used for one hinge 24 has been exemplified, a configuration that one nut 44 has been used may be also made as illustrated in FIG. 8. In the case of this configuration, for example, one pair of the anchor parts 48 may be used so as to sandwich the nut 44 between the anchor parts 48. In particular, in the case of the electronic apparatus 14, a configuration that the anchor parts 48 are arranged side by side in the direction (the top-to-down direction in FIG. 8) directing from the coupling end part 50a toward the open end part 50b of the chassis 12 and the nut 44 is arranged between the anchor parts 48 may be made.

Incidentally, it goes without saying that the present invention is not limited to the above-mentioned embodiment and it is possible to freely change the configuration within a range not deviating from the gist of the present invention.

For example, although in the above-mentioned embodiment, the configuration that the member for chassis 10 has been used as the rear face cover 12a of the chassis 12 of the lid body 16 which configures the electronic apparatus 14 has been exemplified, the member for chassis 10 may be also used as the front face cover 12b and the apparatus main body 20. In addition, it is possible to utilize the member for chassis 10 as the members of chassis of various electronic apparatuses such as the Laptop PC, the tablet PC, the smart phone and/or the portable phone and so forth. In addition, the female screw part (the nut 44) which configures the member for chassis 10 may be utilized for applications other than clamping of the hinge 24 and may be utilized, for example, as the female screw part used when clamping the front face cover 12b to the rear face cover 12a configured by the member for chassis 10.

Although in the above-mentioned embodiment, the member for chassis 10 using the laminated sheet 30 of the three-layer structure has been exemplified, the laminated sheet 30 may have a laminated structure of five or more layers that each intermediate layer 42 has been sandwiched between the respective layers of, for example, the three or more fiber reinforced resin sheets 40 and 41.

As has been described, the present invention provides an improved chassis member that has a higher strength.

While the invention has been particularly shown and described with reference to a preferred embodiment, it will be understood by those skilled in the art that various changes in form and detail may be made therein without departing from the spirit and scope of the invention.

What is claimed is:

1. A member for chassis comprising:
   a laminated sheet having an intermediate layer located between a pair of fiber reinforced resin sheets, wherein said laminated sheet includes an anchor part formed by an opening in one of said fiber reinforced resin sheets and an opening in said intermediate layer; and
   a frame part formed by a thermoplastic resin bonded to an end face of said laminated sheet, to said anchor part of said laminated sheet, and to a surface of said laminated sheet, wherein said thermoplastic resin of said frame part fills said opening in said one fiber reinforced resin sheet and said opening in said intermediate layer, wherein a screw is provided in said frame part that has been extended to said surface of said laminated sheet.

2. The member for chassis of claim 1, wherein said screw is a nut that is positioned and fixed by a boss part formed by said thermoplastic resin.

3. The member for chassis of claim 1, wherein said anchor part includes a second opening in said one fiber reinforced resin sheet and a second opening in said intermediate layer, wherein said thermoplastic resin of said frame part fills said second opening in said one fiber reinforced resin sheet and said second opening in said intermediate layer.

4. The member for chassis of claim 3, wherein said second opening in said one fiber reinforced resin sheet has a smaller diameter than said second opening in said intermediate layer.

5. The member for chassis of claim 1, wherein said opening in said one fiber reinforced resin sheet has a smaller diameter than said opening in said intermediate layer.

6. An electronic device comprising:
   a first chassis;
   a second chassis coupled to said first chassis via a hinge located at a hinge area that includes
      a laminated sheet having an intermediate layer located between a pair of fiber reinforced resin sheets, wherein said laminated sheet includes an anchor part formed by an opening in one of said fiber reinforced resin sheets and an opening in said intermediate layer; and
      a frame part formed by a thermoplastic resin bonded to an end face of said laminated sheet, to said anchor part of said laminated sheet, and to a surface of said laminated sheet, wherein said thermoplastic resin of said frame part fills said opening in said one fiber reinforced resin sheet and said opening in said intermediate layer.

7. The electronic device of claim 6, wherein a screw is provided in said frame part that is extended to said surface of said laminated sheet, and said hinge is fixed to said screw.

8. The electronic device of claim 7, wherein said female screw is a nut that is positioned and fixed by a boss part formed by said thermoplastic resin.

9. The electronic device of claim 6, wherein said anchor par includes a second opening in said one fiber reinforced resin sheet and a second opening in said intermediate layer, wherein said thermoplastic resin of said frame part fills said second opening in said one fiber reinforced resin sheet and said second opening in said intermediate layer.

10. The electronic device of claim 7, wherein said anchor part is provided in a state where position thereof deviates from the position of said screw in a direction directing from one end parts of said first chassis and said second chassis that are coupled together by said hinge to the opposite-side other end parts of said first chassis and said second chassis.

11. The electronic device of claim 7, wherein on said first chassis, the other end part on said opposite side of said one end part at which said first chassis is coupled with said second chassis by said hinge projects in a state where the position thereof deviates from the position of said other end part of the other chassis in a direction directing from the one end parts to the other end parts of said first chassis and said second chassis.

12. The electronic device of claim 9, wherein said anchor part includes a second opening in said one fiber reinforced resin sheet and a second opening in said intermediate layer.

13. The electronic device of claim 6, wherein said opening in said one fiber reinforced resin sheet has a smaller diameter than said opening in said intermediate layer.

14. The electronic device of claim 6, wherein said intermediate layer is made of a foamed sheet.

15. The electronic device of claim 6, wherein said second chassis contains a screen.

16. The electronic device of claim 15, wherein said first chassis contains a keyboard.

17. The member for chassis of claim 1, wherein said intermediate layer is made of a foamed sheet.

* * * * *